(12) United States Patent
Chauvel et al.

(10) Patent No.: US 7,360,060 B2
(45) Date of Patent: Apr. 15, 2008

(54) USING IMPDEP2 FOR SYSTEM COMMANDS RELATED TO JAVA ACCELERATOR HARDWARE

(75) Inventors: Gerard Chauvel, Antibes (FR); Serge Lasserre, Frejus (FR)

(73) Assignee: Texas Instruments Incorporated, Dallas, TX (US)

(*) Notice: Subject to any disclaimer, the term of this patent is extended or adjusted under 35 U.S.C. 154(b) by 709 days.

(21) Appl. No.: 10/632,069

(22) Filed: Jul. 31, 2003

(65) Prior Publication Data

US 2004/0024991 A1 Feb. 5, 2004

Related U.S. Application Data

(60) Provisional application No. 60/400,391, filed on Jul. 31, 2002.

(30) Foreign Application Priority Data

Jul. 30, 2003 (EP) .................. 03291909

(51) Int. Cl.
*G06F 9/30* (2006.01)
(52) U.S. Cl. .................. 712/209; 712/213
(58) Field of Classification Search ............. 712/209, 712/213
See application file for complete search history.

(56) References Cited

U.S. PATENT DOCUMENTS

| | | | |
|---|---|---|---|
| 6,014,735 A * | 1/2000 | Chennupaty et al. ....... 712/210 |
| 6,098,089 A | 8/2000 | O'Connor et al. ......... 709/104 |
| 6,253,287 B1 * | 6/2001 | Green ..................... 711/125 |
| 6,256,714 B1 * | 7/2001 | Sampsell et al. .......... 711/154 |
| 6,412,021 B1 * | 6/2002 | Nguyen et al. ............ 719/318 |
| 6,480,952 B2 * | 11/2002 | Gorishek et al. .......... 712/227 |
| 6,560,694 B1 * | 5/2003 | McGrath et al. ........... 712/210 |
| 6,567,905 B2 | 5/2003 | Otis ...................... 711/170 |
| 6,571,260 B1 | 5/2003 | Morris .................... 707/206 |
| 6,584,558 B2 * | 6/2003 | Hammond et al. ........ 712/244 |
| 6,625,724 B1 * | 9/2003 | Kahn et al. ............... 712/229 |
| 6,832,305 B2 * | 12/2004 | Park et al. ................ 712/34 |
| 6,842,811 B2 * | 1/2005 | Barry et al. .............. 710/260 |
| 2002/0065990 A1 | 5/2002 | Chauvel et al. ........... 711/137 |
| 2002/0069332 A1 | 6/2002 | Chauvel et al. ........... 711/144 |
| 2003/0101320 A1 | 5/2003 | Chauvel et al. ........... 711/154 |

* cited by examiner

*Primary Examiner*—Richard L. Ellis
*Assistant Examiner*—Jacob Petranek
(74) *Attorney, Agent, or Firm*—Ronald O. Neerings; Wade James Brady, III; Frederick J. Telecky, Jr.

(57) ABSTRACT

A processor (e.g., a co-processor) comprising a decoder adapted to decode instructions from a first instruction set in a first mode and a second instruction set in a second mode. A pre-decoder coupled to the decoder, and operates in parallel with the decoder, determines the mode of operation for the decode logic for subsequent instructions. In particular, the decode logic operating in a current mode concurrently with the pre-decoder detecting a predetermined prefix, which indicates a subsequent instruction is a system command. Upon detecting this predetermined prefix, the decoder decodes the system command accordingly.

21 Claims, 3 Drawing Sheets

FIG. 3

| R0 | GENERAL PURPOSE (GP) |
|---|---|
| R1 | GENERAL PURPOSE (GP) |
| R2 | GENERAL PURPOSE (GP) |
| R3 | GENERAL PURPOSE (GP) |
| R4 | PROGRAM COUNTER (PC) |
| R5 | GENERAL PURPOSE/LOCAL VARIABLE POINTER (LV) |
| R6 | STACK POINTER (SP) |
| R7 | TOP OF STACK (TOS) |
| R8 | GENERAL PURPOSE/ADDRESS INDEX 0 (AI0) |
| R9 | GENERAL PURPOSE/ADDRESS INDEX 1 (AI1) |
| R10 | GENERAL PURPOSE (GP) |
| R11 | GENERAL PURPOSE (GP) |
| R12 | MICRO-PROGRAM COUNTER (MICRO-PC) |
| R13 | GENERAL PURPOSE (GP) |
| R14 | GENERAL PURPOSE/INDIRECT REGISTER INDEX (IRI) |
| R15 | STATUS AND CONTROL (ST) |

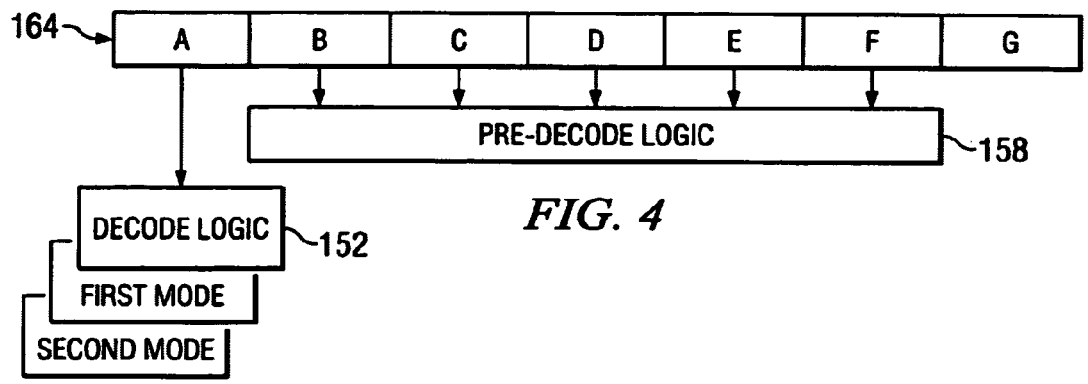

FIG. 4

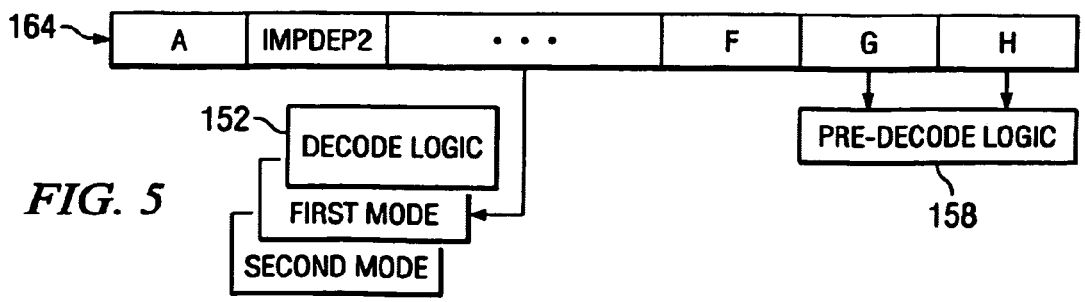

FIG. 5

USING IMPDEP2 FOR SYSTEM COMMANDS RELATED TO JAVA ACCELERATOR HARDWARE

CROSS-REFERENCE TO RELATED APPLICATIONS

This application claims priority to U.S. Provisional Application Ser. No. 60/400,391 titled "JSM Protection," filed Jul. 31, 2002, incorporated herein by reference. This application also claims priority to EPO Application No. 03291909.4, filed Jul. 30, 2003 and entitled "Using IMPDEP2 For System Commands Related To Java Accelerator Hardware," incorporated herein by reference. This application also may contain subject matter that may relate to the following commonly assigned co-pending applications incorporated herein by reference: "System And Method To Automatically Stack And Unstack Java Local Variables," Ser. No. 10/632,228, filed Jul. 31, 2003; "Memory Management Of Local Variables," Ser. No. 10/632,067, filed Jul. 31, 2003; "Memory Management Of Local Variables Upon A Change Of Context," Ser. No. 10/632,076, filed Jul. 31, 2003; "A Processor With A Split Stack," Ser. No. 10/632,079, filed Jul. 31, 2003; "Test With Immediate And Skip Processor Instruction," Ser. No. 10/632,214, filed Jul. 31, 2003; "Test And Skip Processor Instruction Having At Least One Register Operand," Ser. No. 10/632,084, filed Jul. 31, 2003; "Synchronizing Stack Storage," Ser. No. 10/631,422, filed Jul. 31, 2003; "Methods And Apparatuses For Managing Memory," Ser. No. 10/631,252, filed Jul. 31, 2003; "Write Back Policy For Memory," Ser. No. 10/631,185, filed Jul. 31, 2003; "Methods And Apparatuses For Managing Memory," Ser. No. 10/631,205, filed Jul. 31, 2003; "Mixed Stack-Based RISC Processor," Ser. No. 10/631,308, filed Jul. 31, 2003; "Processor That Accommodates Multiple Instruction Sets And Multiple Decode Modes," Ser. No. 10/631,246, filed Jul. 31, 2003; "System To Dispatch Several Instructions On Available Hardware Resources," Ser. No. 10/631,585, filed Jul. 31, 2003; "Micro-Sequence Execution In A Processor," Ser. No. 10/632,216, filed Jul. 31, 2003; "Program Counter Adjustment Based On The Detection Of An Instruction Prefix," Ser. No. 10/632,222, filed Jul. 31, 2003; "Reformat Logic To Translate Between A Virtual Address And A Compressed Physical Address," Ser. No. 10/632,215, filed Jul. 31, 2003; "Synchronization Of Processor States," Ser. No. 10/632,024, filed Jul. 31, 2003; "Conditional Garbage Based On Monitoring To Improve Real Time Performance," Ser. No. 10/631,195, filed Jul. 31, 2003; "Inter-Processor Control," Ser. No. 10/631,120, filed Jul. 31, 2003; "Cache Coherency In A Multi-Processor System," Ser. No. 10/632,229, filed Jul. 31, 2003; "Concurrent Task Execution in A Multi-Processor, Single Operating System Environment," Ser. No. 10/632,077, filed Jul. 31, 2003; and "A Multi-Processor Computing System Having A Java Stack Machine And A RISC-Based Processor," Ser. No. 10/631,939, filed Jul. 31, 2003.

BACKGROUND OF THE INVENTION

1. Technical Field of the Invention

The present invention relates generally to processors and more particularly to a processor capable of executing system commands from two instruction sets.

2. Background Information

Many types of electronic devices are battery operated and thus preferably consume as little power as possible. An example is a cellular telephone. Further, it may be desirable to implement various types of multimedia functionality in an electronic device such as a cell phone. Examples of multimedia functionality may include, without limitation, games, audio decoders, digital cameras, etc. It is thus desirable to implement such functionality in an electronic device in a way that, all else being equal, is fast, consumes as little power as possible and requires as little memory as possible. Improvements in this area are desirable.

BRIEF SUMMARY OF THE PREFERRED EMBODIMENTS

As disclosed herein, a processor (e.g., a co-processor) includes decode logic capable of decoding instructions from a first instruction set in a first mode and capable of decoding instructions from a second instruction set in a second mode. In accordance with at least some embodiments of the invention, a pre-decode logic is capable of detecting predetermined prefixes. The predetermined prefix is an implementation dependent Java Bytecode indicating at least one system command follows. For example, the decode logic may be operating in a first mode and may decode the predetermined prefix, where the predetermined prefix indicates at least one system command from the second instruction set follows. When operating in the second mode, the predetermined prefix, simply indicates that this is a system commands.

Notation and Nomenclature

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct connection. Thus, if a first device couples to a second device, that connection may be through a direct connection, or through an indirect connection via other devices and connections.

BRIEF DESCRIPTION OF THE DRAWINGS

For a more detailed description of the preferred embodiments of the present invention, reference will now be made to the accompanying drawings, wherein:

FIG. 3 shows various registers used in the JSM of FIGS. 1 and 2;

FIG. 4 illustrates decoding an instruction in a first mode;

FIG. 5 illustrates decoding a system command from a second instruction set in a first mode;

DETAILED DESCRIPTION OF THE PREFERRED EMBODIMENTS

The following discussion is directed to various embodiments of the invention. Although one or more of these embodiments may be preferred, the embodiments disclosed should not be interpreted, or otherwise used, as limiting the scope of the disclosure, including the claims, unless otherwise specified. In addition, one skilled in the art will understand that the following description has broad application, and the discussion of any embodiment is meant only to be exemplary of that embodiment, and not intended to intimate that the scope of the disclosure, including the claims, is limited to that embodiment.

The subject matter disclosed herein is directed to a programmable electronic device such as a processor. The processor described herein may be particularly suited for executing Java™ Bytecodes, or comparable code. As is well known, Java is particularly suited for embedded applications and is a relatively "dense" language meaning that on average, each instruction may perform a large number of functions compared to many other programming languages. The dense nature of Java is of particular benefit for portable, battery-operated devices that preferably include as little memory as possible to save space and power. The reason, however, for executing Java code is not material to this disclosure or the claims that follow. The embodiment of the invention may be described in the context of Java but should not limit the execution of only Java instructions. The processor described herein may be used in a wide variety of electronic systems.

Figure 1:
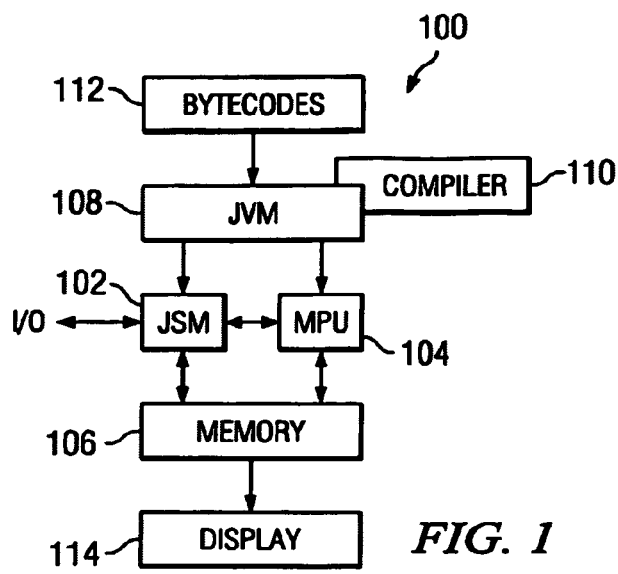
FIG. 1 shows a diagram of a system in accordance with preferred embodiments of the invention and including a Java Stack Machine ("JSM") and a Main Processor Unit ("MPU")

Referring now to FIG. 1, a system 100 is shown in accordance with a preferred embodiment of the invention. As shown, the system includes at least two processors 102 and 104. Processor 102 is referred to for purposes of this disclosure as a Java Stack Machine ("JSM") and processor 104 may be referred to as a Main Processor Unit ("MPU"). System 100 may also include memory 106 coupled to both the JSM 102 and MPU 104 and thus accessible by both processors. At least a portion of the memory 106 may be shared by both processors meaning that both processors may access the same shared memory locations. Further, if desired, a portion of the memory 106 may be designated as private to one processor or the other. System 100 also includes a Java Virtual Machine ("JVM") 108, compiler 110, and a display 114. The JSM 102 preferably includes an interface to one or more input/output ("I/O") devices such as a keypad to permit a user to control various aspects of the system 100. In addition, data streams may be received from the I/O space into the JSM 102 to be processed by the JSM 102. Other components (not specifically shown) may be included as well.

As is generally well known, Java code comprises a plurality of "Bytecodes" 112. Bytecodes 112 may be provided to the JVM 108, compiled by compiler 110 and provided to the JSM 102 and/or MPU 104 for execution therein. In accordance with a preferred embodiment of the invention, the JSM 102 may execute at least some, and generally most, of the Java Bytecodes. When appropriate, however, the JSM 102 may request the MPU 104 to execute one or more Java Bytecodes not executed or executable by the JSM 102. In addition to executing Java Bytecodes, the MPU 104 also may execute non-Java instructions. The MPU 104 also hosts an operating system ("O/S") (not specifically shown), which performs various functions including system memory management, the system task management that schedules the JVM 108 and most or all other native tasks running on the system, management of the display 114, receiving input from input devices, etc. Without limitation, Java code may be used to perform any one of a variety of applications including multimedia, games or web-based applications in the system 100, while non-Java code, which may comprise the O/S and other native applications, may still run on the system on the MPU 104.

The JVM 108 generally comprises a combination of software and hardware. The software may include the compiler 110 and the hardware may include the JSM 102. The JVM may include a class loader, Bytecode verifier, garbage collector, and a Bytecode interpreter loop to interpret the Bytecodes that are not executed on the JSM processor 102.

In accordance with preferred embodiments of the invention, the JSM 102 may execute at least two instruction sets. One instruction set may comprise standard Java Bytecodes. As is well known, Java is a stack-based programming language in which instructions generally target a stack. For example, an integer add ("IADD") Java instruction pops two integers off the top of the stack, adds them together, and pushes the sum back on the stack. In general, the JSM 102 comprises a stack-based architecture with various features that accelerate the execution of stack-based Java code.

Another instruction set executed by the JSM 102 may include instructions other than standard Java instructions. In accordance with at least some embodiments of the invention, such other instruction set may include register-based and memory-based operations to be performed. This other instruction set generally complements the Java instruction set and, accordingly, may be referred to as a complementary instruction set architecture ("C-ISA") such as those instructions disclosed in one or more of the previously listed co-pending applications included herein by reference. By complementary, it is meant that at least some Java Bytecodes may be replaced by micro-sequences using C-ISA instructions that permit address calculation to readily "walk through" the JVM data structures. A micro-sequence may comprise one or more C-ISA instructions. Further, such micro-sequences may also use Bytecode instructions. The execution of Java may be made more efficient and run faster by replacing some sequences of Bytecodes by preferably shorter and more efficient sequences of C-ISA instructions. The two sets of instructions may be used in a complementary fashion to obtain satisfactory code density and efficiency. As such, the JSM 102 generally comprises a stack-based architecture for efficient and accelerated execution of Java Bytecodes combined with a register-based architecture for executing register and memory based C-ISA instructions. Both architectures preferably are tightly combined and integrated through the C-ISA.

Figure 2:
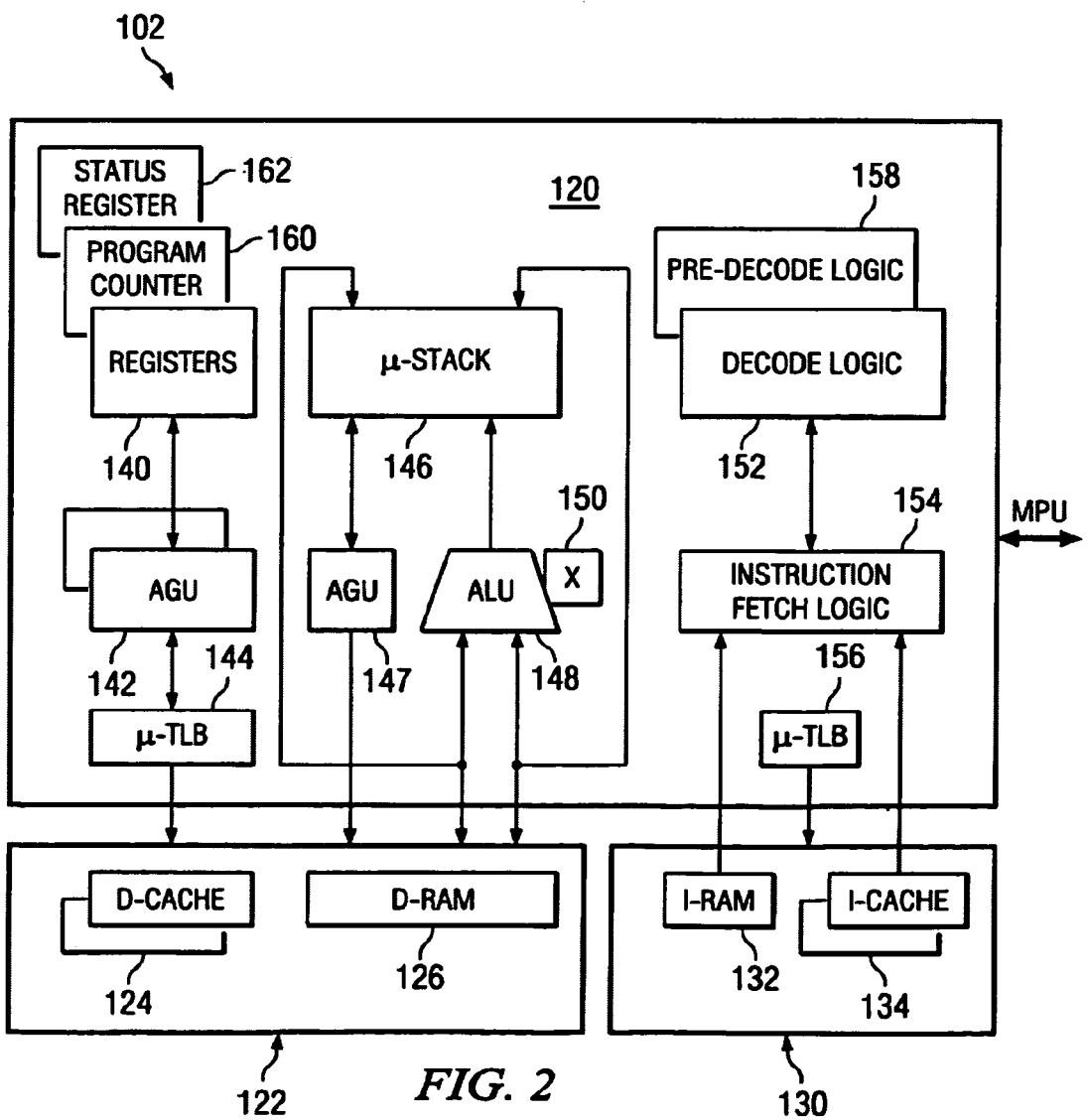
FIG. 2 shows a block diagram of the JSM of FIG. 1 in accordance with preferred embodiments of the invention.

FIG. 2 shows an exemplary block diagram of the JSM 102. As shown, the JSM includes a core 120 coupled to data storage 122 and instruction storage 130. The core may include one or more components as shown. Such components preferably include a plurality of registers 140, including a program counter 160 and a status register 162, three address generation units ("AGUs") 142, 147, micro-translation lookaside buffers (micro-TLBs) 144, 156, a multi-entry micro-stack 146, an arithmetic logic unit ("ALU") 148, a multiplier 150, decode logic 152, instruction fetch logic 154, and pre-decode logic 158. In general, operands may be retrieved from data storage 122 or from the micro-stack 146, processed by the ALU 148, while instructions may be fetched from instruction storage 130 by fetch logic 154, pre-decoded by pre-decode logic 158, and decoded by decode logic 152. The address generation unit 142 may be used to calculate addresses based, at least in part on data contained in the registers 140. The AGUs 142 may calculate addresses for C-ISA instructions as will be described below. The AGUs 142 may support parallel data accesses for C-ISA instructions that perform array or other types of processing. AGU 147 couples to the micro-stack 146 and may manage overflow and underflow conditions in the micro-stack preferably in parallel. The micro-TLBs 144, 156 generally perform the function of a cache for the address translation and memory protection information bits that are preferably under the control of the operating system running on the MPU 104. The decode logic 152 and the pre-decode logic 158 may be adapted to execute both the standard Java instructions as well as the C-ISA instructions of the system. The operation of the decode logic 152 and the pre-decode logic 158 will be described in more detail below.

Referring now to FIG. 3, the registers 140 may include 16 registers designated as R0-R15. Registers R0-R3, R5, R8-R11 and R13-R14 may be used as general purposes ("GP") registers usable for any purpose by the programmer. Other registers, and some of the GP registers, may be used for specific functions. For example, registers R4 and R12 may be used to store two program counters. Register R4 preferably is used to store the program counter ("PC") and register R12 preferably is used to store a micro-program counter ("micro-PC"). In addition to use as a GP register, register R5 may be used to store the base address of a portion of memory in which Java local variables may be stored when used by the current Java method. The top of the micro-stack 146 is referenced in registers R6 and R7. The top of the micro-stack has a matching address in external memory pointed to by register R6. The values contained in the micro-stack are the latest updated values, while their corresponding values in external memory may or may not be up to date. Register R7 provides the data value stored at the top of the micro-stack. Registers R8 and R9 may also be used to hold the address index 0 ("AI0") and address index 1 ("AI1"). Register R14 may also be used to hold the indirect register index ("IRI"). Register R15 may be used for status and control of the JSM 102. As an example, the status/control bit may indicate if the JSM 102 is executing a "simple" instruction or a "complex" instruction through a micro-sequence. This bit controls in particular, which program counter is used R4 (PC) or R12 (micro-PC) to fetch the next instruction. A "simple" Bytecode instruction is generally one in which the JSM 102 may perform an immediate operation either in a single cycle (e.g., an "iadd" instruction) or in several cycles (e.g., "dup2_x2"). A "complex" Bytecode instruction is one in which several memory accesses may be required to be made within the JVM data structures for various verifications (NULL pointer, array boundaries, etc.). In another example, the status/control bit may indicate if the JSM 102 is executing an instruction of a first instruction set, e.g., the standard Java instruction set, or executing an instruction of a second instruction set, e.g., the C-ISA instruction set. Because these data structures are generally JVM-dependent and thus may change from one JVM implementation to another, the software flexibility of the micro-sequence provides a mechanism for various JVM optimizations now known or later developed.

Referring again to FIG. 2, as noted above, the JSM 102 may be adapted to process and execute instructions from at least two instruction sets. One instruction set includes stack-based operations and the second instruction set includes register-based and memory-based operations. The stack-based instruction set may include Java Bytecodes. Unless empty, Java Bytecodes pop data from and push data onto the micro-stack 146. The micro-stack 146 preferably comprises the top n entries of a larger stack that may be implemented in data storage 122. Although the value of n may be vary in different embodiments, in accordance with at least some embodiments, the size n of the micro-stack may be the top eight entries in the larger, memory-based stack. The micro-stack 146 preferably comprises a plurality of gates in the core 120 of the JSM 102. By implementing the micro-stack 146 in gates (e.g., registers) in the core 120 of the processor 102, access to the data contained in the micro-stack 146 is generally very fast, although any particular access speed is not a limitation on this disclosure.

The second, register-based, memory-based instruction set may comprise the C-ISA instruction set introduced above. The C-ISA instruction set preferably is complementary to the Java Bytecode instruction set in that the C-ISA instructions may be used to accelerate or otherwise enhance the execution of Java Bytecodes.

The ALU 148 adds, subtracts, and shifts data. The multiplier 150 may be used to multiply two values together in one or more cycles. The instruction fetch logic 154 generally fetches instructions from instruction storage 130. The instructions first may be pre-decoded by the pre-decode logic by 158 and then decoded by decode logic 152. Because the JSM 102 may be adapted to process instructions from at least two instruction sets, the decode logic 152 generally comprises at least two modes of operation, one mode for each instruction set. In particular, the decode logic unit 152 may include a "Java" mode in which Java instructions may be decoded and a "C-ISA" mode in which C-ISA instructions may be decoded. Of course, the modes depend on the particular instruction sets implemented which may be different from the instrument sets described herein. The function of the pre-decode logic 158 and decode logic 152 will be discussed in more detail below.

The data storage 122 generally comprises data cache ("D-cache") 124 and data random access memory ("D-RAMset") 126. Reference may be made to applications U.S. Ser. No. 09/591,537 filed Jun. 9, 2000 Now U.S. Pat. No. 6,826,652), Ser. No. 09/591,656 filed Jun. 9, 2000 Now U.S. Pat. No. 6,792,508), and Ser. No. 09/932,794 filed Aug. 11, 2001 Now U.S. Pat. No. 6,789,172), all of which are incorporated herein by reference. The stack (excluding the micro-stack 146), arrays and non-critical data may be stored in the D-cache 124, while Java local variables, critical data and non-Java variables (e.g., C, C++) may be stored in D-RAM 126. The instruction storage 130 may comprise instruction RAM ("I-RAM") 132 and instruction cache ("I-cache") 134. The I-RAMset 132 may be used for "complex" micro-sequenced Bytecodes or other "micro-sequences or critical sequences of codes," as will be described below. The I-cache 134 may be used to store other types of Java Bytecode and mixed Java/CISA instructions.

In accordance with the preferred embodiments, the decode logic may be capable of decoding instructions in two modes. The first mode is for instructions of a first instruction set, e.g. standard Java instruction set. The decode logic 152 may also decode instructions from a second instruction set, e.g., C-ISA, in a second mode. In order to ensure the appropriate decode mode for the decoding of instructions, the pre-decode logic 158 may pre-decode some instructions prior to loading instructions in the decode logic 152. In particular, the pre-decode logic may pre-decode for instructions defined by the implementation that indicates the mode the decode logic should operate in for at least a succeeding instruction.

Referring to FIG. 4, a portion of a program may include a plurality of bytes 164 (labeled as bytes "A" through "G").

In Java, these bytes may be called "Bytecodes." Therefore, for simplicity, these bytes may be referred as Bytecodes in both instruction sets. One or more of those bytes form a Java instruction. The Java instruction set, therefore, may include variable length instructions. In C-ISA, the instruction length also may vary in length (e.g., 1, or 2 to 4 bytes) and, like the Java instructions, the length may only be determined by the decode logic 152. In accordance with the preferred embodiments, while the decode logic 152 is decoding Bytecode A of an instruction set in a first mode, where Bytecode A may be all or a portion of the instruction, the next five Bytecodes preferably are provided to pre-decode logic 158 for pre-decoding. As illustrated, Bytecodes B through F are pre-decoded by the pre-decode logic 158 in parallel with the decoding of Bytecode A.

In a preferred embodiment, system commands (e.g., mask, unmask, micro-stack-clean, etc.) are accessible from the first and second instruction sets due to a common Bytecode in each instruction set. This Bytecode may be used to determine that the following instruction is a system command. System commands may belong to one instruction set and preferably to the second instruction set. A system command, as described herein, is an instruction that executes a variety of system tasks essential for the execution of instructions. In some embodiments, the decode logic may be adapted to switch modes depending on an instruction and to which the instruction belongs. An instruction may be made up of one Bytecode, or the plurality of Bytecodes. However, the Bytecodes that make up the instruction in one instruction set may also be used in another instruction set but may not constitute the same instruction. As such, the decoder must be adapted to decode instructions based on the instruction set.

Referring again to FIG. 4, while the decode logic 152 is decoding Bytecode A, pre-decode logic 158 may pre-decode five Bytecodes following Bytecode A. In particular, the pre-decode logic may pre-decode Bytecodes defined by the implementation that indicates the mode the decode logic should operate in for at least a succeeding instruction. For example, if Bytecode A belongs to the first instruction set, the pre-decode logic 152 may detect Bytecode B is a predetermined prefix which indicates at least one instruction from the second instruction set following the predetermined prefix corresponds to the system command. If Bytecode A belongs to the second instruction set, the pre-decode logic 152 may detect that Bytecode B is a predetermined prefix which indicates at least one system command follows, in which the system command belongs to the second instruction set. The predetermined prefix, common to both instruction sets, may be an implementation dependent Bytecode, such as a Java Impdep2 Bytecode. In a preferred embodiment, after detecting the predetermined prefix, the Bytecode succeeding the predetermined prefix is loaded into the decode logic 152. Referring to FIG. 5, the decode logic 152, after decoding Bytecode A, may immediately decode Bytecode C, a system command when executing instruction in the first mode. Similarly, if the decode logic is operating in the second mode and the Java Impdep2 instruction is detected, the decode logic may remain in the second mode to decode the at least one system instruction.

As noted above, the succeeding instruction following the predetermined prefix is loaded into the decoder after detecting the predetermined prefix. Such an embodiment allows for the decoder to "skip" the decoding of the predetermined prefix, saving cycle time. However, in one embodiment, the predetermined prefix may be decoded by the decoder. For example, the decoder may be decoding an instruction from a first instruction set, and the instruction causes a break in the sequential execution of the instructions (e.g., a branch instruction, a jump instruction, etc.), and points to a predetermined prefix, the Java Imdep2 Bytecode. The predetermined prefix, indicating the succeeding instruction is a system command from a second instruction set, may be loaded into the decoder for decoding. Thus, the decoding of an instruction and detecting of a predetermined prefix may also be done sequentially.

System commands, however, may be the same for both instruction sets, and thus, eliminates the need to switch between the decode logic modes. A common opcode may be utilized in both instruction sets to specify the system commands.

By pre-decoding a predetermined prefix belonging to both instruction sets that indicates that at least a following instruction is a system command, the decode logic 152 may be able to execute the system command in either mode. This may allow, in particular, a decode mode bit managing the execution of system commands or any other status/control bits to access the system commands without knowing what mode of operation is currently being ran by the decode logic. Furthermore, by pre-decoding the predetermined prefix in parallel with the decoding process, the predetermined instruction need not be loaded into the decode logic 152 and thus, improve the cycle time of decoding instructions, specifically system commands, from two different instruction set.

Figure 6A:
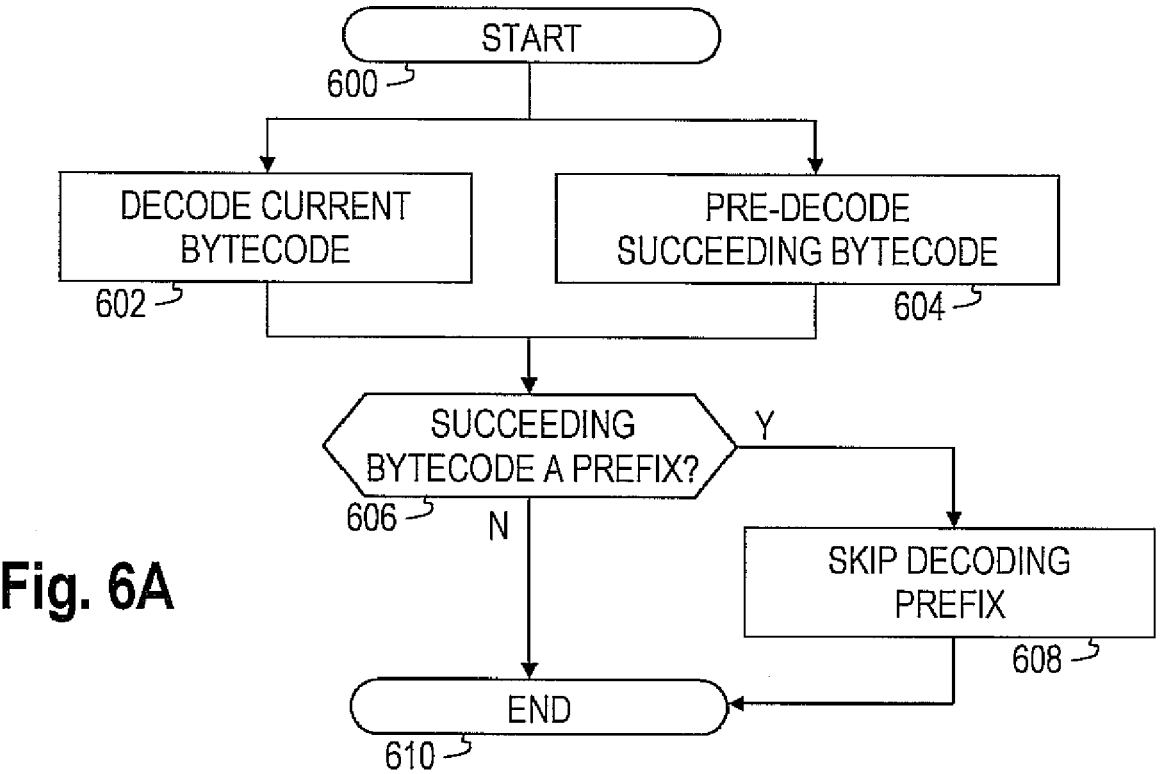
FIG. 6A illustrates a method in accordance with at least some embodiments.

FIG. 6A illustrates a method in accordance with at east some embodiments. The method starts (block 600) and moves to decoding the current bytecode (block 602). Concurrently with decoding the current bytecode, the succeeding bytecode is pre-decoded (block 604). Thereafter, a determination is made as to whether the pre-decoded bytecode is a predetermined prefix (block 606). If so, decoding of the predetermined prefix is skipped (block 608), and the method ends (block 610). If the succeeding bytecode is not a predetermined prefix (again block 608), the process ends (block 610).

Figure 6B:
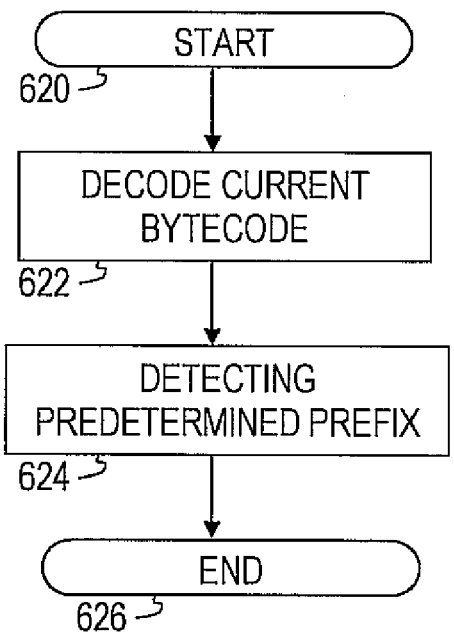
FIG. 6B illustrates a method in accordance with alternative embodiments.

FIG. 6B illustrates a method in accordance with alternative embodiments. The method starts (block 620) and moves to decoding the current bytecode (block 622). Thereafter, the succeeding bytecode, which may be the predetermined prefix discussed above, is detected (block 624). Finally, the process ends (block 626).

While the preferred embodiments of the present invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Accordingly, the scope of protection is not limited by the description set out above. Each and every claim is incorporated into the specification as an embodiment of the present invention.

What is claimed is:

1. A processor, comprising: decode logic configured to decode system commands and instructions in a first mode and in a second mode, wherein the first mode corresponds to a first instruction set and the second mode corresponds to a second instruction set;

wherein the first and second instruction set each comprises a predetermined prefix, and the system commands are accessible in either mode through a common Bytecode that corresponds to the predetermined prefix;

wherein the predetermined prefix indicates that a system command follows.

2. The processor of claim 1, wherein the system commands belong to the first instruction set.

3. The processor of claim 1, wherein the system commands belong to the second instruction set.

4. The processor of claim 1, wherein the predetermined prefix is a Java Impdep2 Bytecode.

5. The processor of claim 1, wherein the processor further comprises a pre-decode logic coupled to the decode logic, and wherein the pre-decode logic is adapted to pre-decode the predetermined prefix concurrently with the decode logic decoding a preceding instruction.

6. The processor of claim 1 wherein the predetermined prefix is decoded.

7. A processor, comprising:
   decode logic adapted to decode instructions from a first instruction set in a first mode and decode instructions from a second instruction set in a second mode;
   pre-decode logic coupled to the decode logic, wherein the pre-decode logic is adapted to pre-decode instructions prior to loading the instruction into the decode logic; and
   wherein while the decode logic is decoding an instruction from the first instruction set or a second instruction set, the pre-decode logic detects a predetermined prefix indicating a succeeding instruction is a system command, the decode logic remains in a current mode and decodes the succeeding instruction.

8. The processor of claim 7, wherein the decode logic is decoding instructions from the first instruction set, and wherein the current mode is the first mode.

9. The processor of claim 7, wherein the decode logic is decoding instructions from the second instruction set, and wherein the current mode is the second mode.

10. The processor of claim 7, wherein the predetermined prefix is a Java Impdep2 Bytecode, and wherein the first and second instruction set each comprises the Java Impdep2 Bytecode.

11. The processor of claim 7, wherein the decode logic skips decoding of the predetermined prefix and decodes the succeeding instruction immediately following the instruction from the first instruction set.

12. The processor of claim 7, wherein the decode logic decodes the predetermined prefix immediately following the instruction from the first instruction set.

13. The processor of claim 7, wherein the system command belongs to the first instruction set.

14. The processor of claim 7, wherein the system command belongs to the second instruction set.

15. A system, comprising:
   main processor;
   co-processor coupled to the main processor, the co-processor comprising:
      decode logic adapted to decode instructions from a first instruction set in a first mode and decode instructions from a second instruction set in a second mode; and
      wherein upon detecting a predetermined prefix indicating a succeeding instruction is a system command, the co-processor stays in the current mode.

16. The system of claim 15, wherein the current mode is the first mode, and wherein the system command belongs to the first or second instruction set.

17. The system of claim 15, wherein the predetermined prefix is a Java Impdep2 Bytecode, and wherein the first and second instruction sets each comprises the Java Impdep2 Bytecode.

18. The system of claim 15, wherein the co-processor further comprises a pre-decode logic coupled to the decode logic and wherein the pre-decode logic is adapted to detect the predetermined prefix.

19. The system of claim 18, wherein the pre-decode logic is further adapted to pre-decode the predetermined prefix concurrently with the decode logic decoding a previous instruction.

20. The system of claim 15, wherein the predetermined prefix is decoded sequentially after the decode logic decodes a previous instruction.

21. The system of claim 15, wherein the system comprises a cellular telephone.

* * * * *